(12) United States Patent
Nakamura et al.

(10) Patent No.: US 6,806,612 B2
(45) Date of Patent: Oct. 19, 2004

(54) ARMATURE COIL FOR SLOTLESS ROTARY ELECTRIC MACHINERY

(75) Inventors: Kimiaki Nakamura, Wako (JP); Naomasa Kimura, Wako (JP); Hiroshi Shiina, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/621,469

(22) Filed: Jul. 18, 2003

(65) Prior Publication Data

US 2004/0017125 A1 Jan. 29, 2004

(30) Foreign Application Priority Data

Jul. 25, 2002 (JP) ..................................... 2002-216508

(51) Int. Cl.⁷ ............................................. H02K 17/00
(52) U.S. Cl. ..................................... 310/208; 310/201
(58) Field of Search ................................ 310/201–208

(56) References Cited

U.S. PATENT DOCUMENTS

| | | | | |
|---|---|---|---|---|
| 1,784,815 A | * | 12/1930 | Apple | .......................... 310/211 |
| 1,796,422 A | * | 3/1931 | Apple | .......................... 310/201 |
| 4,151,433 A | * | 4/1979 | Flick | ............................. 310/54 |
| 5,313,131 A | | 5/1994 | Hibino et al. | ................ 310/254 |
| 5,331,244 A | * | 7/1994 | Rabe | ........................... 310/180 |
| 6,501,205 B1 | * | 12/2002 | Asao et al. | .................. 310/184 |
| 6,629,356 B2 | * | 10/2003 | Wang et al. | ................... 29/596 |

FOREIGN PATENT DOCUMENTS

JP          1-252134          10/1989

* cited by examiner

Primary Examiner—Dang Le
(74) Attorney, Agent, or Firm—Squire, Sanders & Dempsey L.L.P.

(57) ABSTRACT

An armature coil for a rotary electric machinery includes a plurality of identical coil blocks each formed by a plurality of turns of and elongated conductor. Each of the coil blocks includes two groups of axial sections which are diametrically opposed to each other, and curved sections joining the two groups to each other at each axial end. The axial sections of one of the groups is disposed in an inner cylindrical layer while the axial sections of the other of the groups are disposed in an outer cylindrical layer which is coaxial with the inner cylindrical layer. The coil blocks are combined with each other by circumferentially shifting one coil block from another in such a maimer that the axial sections are arranged circumferentially along the inner and outer cylindrical layers, one next to another.

7 Claims, 11 Drawing Sheets

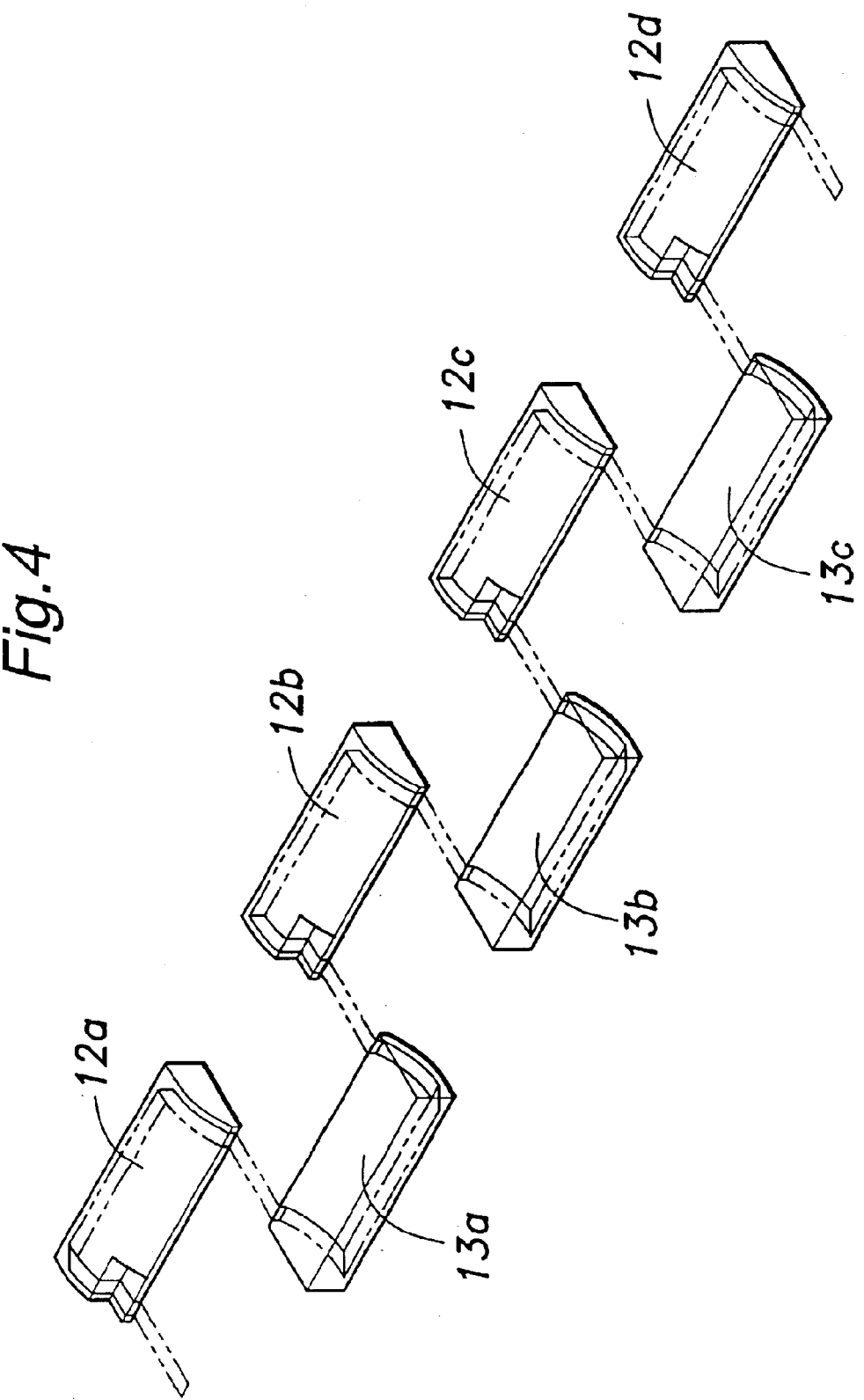

Fig.6
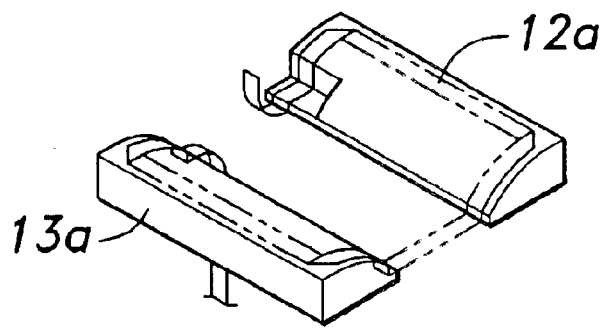
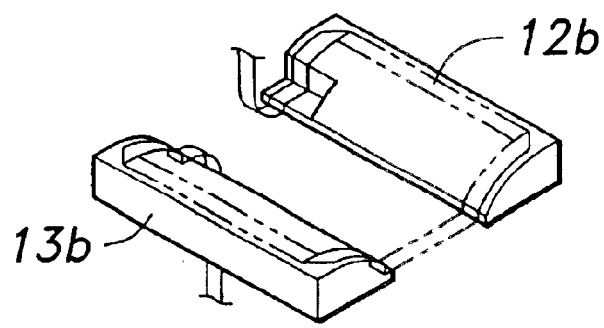
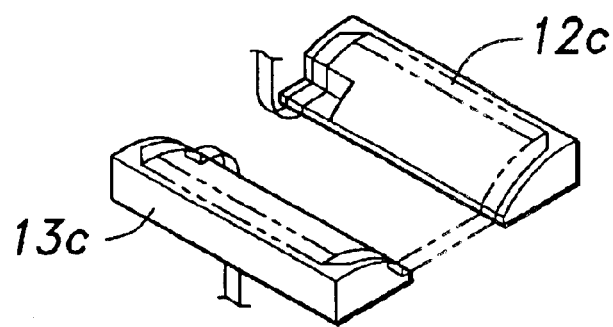
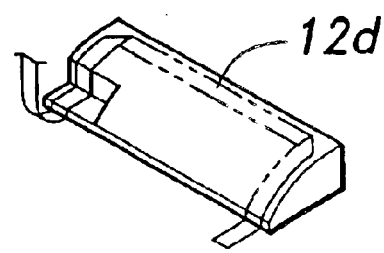

ARMATURE COIL FOR SLOTLESS ROTARY ELECTRIC MACHINERY

TECHNICAL FIELD

The present invention relates to an armature coil, and in particular to an armature coil which is suitable for use in high-speed rotary electric machinery such as electric motors and generators.

BACKGROUND OF THE INVENTION

As a stator coil assembly for generating a rotating magnetic field in rotary electric machinery, it is known to place coils for U, V and W phases in two layers on the inner circumferential surface of a hollow cylindrical slotless stator core via an insulating layer. These coils may consist of a plurality of twisted wires, and may be impregnated with resin so as to be molded into a desired shape. Such examples are disclosed in Japanese patent laid-open publication No. 1-252134A and U.S. Pat. No. 5,313,131, and the contents of these prior patent publications are hereby incorporated in this application by reference.

In such an arrangement, the coils are molded into a plurality of coil blocks and these coil blocks are combined into a cylindrical shape while providing such that individual coils for generating a rotating magnetic field corresponding to the U, V and W phases are arranged as required. Also, the coil wire strands tend to be more dense in the inner layer and more coarse in the outer layer so that the space ratio of the copper tends to be limited, and the copper loss cannot be reduced as much as desired. Also, because the coil wires are distributed relatively coarsely in the outer layer, the removal of heat from the outer layer cannot be effected as efficiently as from the inner layer. In high speed electric generators and motors, eddy current loss and circulation loss as well as copper loss limit the efficiency, and such losses are also desired to be minimized.

BRIEF SUMMARY OF THE INVENTION

In view of such problems of the prior art, a primary object of the present invention is to provide an improved armature coil which is suitable for use in high-speed rotary electric machinery such electric motors and generators.

A second object of the present invention is to provide an armature coil suitable for use in slotless rotary electric machinery.

A third object of the present invention is to provide an armature coil which can minimize various losses.

A fourth object of the present invention is to provide an armature coil which provides a high cooling efficiency.

According to the present invention, at least most of these objects and other objects can be accomplished by providing an armature coil for a rotary electric machinery such as electric generators and motors including a plurality of identical coil blocks each formed by a plurality of turns of an elongated conductor so as to correspond to different phases, characterized by that: each of the coil blocks includes two groups of axial sections which are diametrically opposed to each other and curved sections joining the two groups to each other at each axial end, the axial sections of one of the groups being disposed in an inner cylindrical layer while the axial sections of the other of the groups are disposed in an outer cylindrical layer which is coaxial with the inner cylindrical layer; and the coil blocks are combined with each other by circumferentially shifting one coil block from another in such a manner that the axial sections are arranged circumferentially along the inner and outer cylindrical layers one next to another.

This allows the coils for U, V and W phases to be arranged evenly over the entire circumference, and the copper space ration can be maximized. In particular, if the axial sections disposed in the inner cylindrical layer are smaller in number than those disposed in the outer cylindrical layer by one, the copper space ratio can be maximized even when the cross sectional shape of the conductor is uniform over its entire length.

If each of the coil blocks is formed by a Litz wire conductor which is molded into a prescribed cross sectional shape, the eddy current loss can be minimized, and the conductor can be freely formed into a desired shape with ease. The production efficiency can be further improved by using a substantially cylindrically shaped insulator assembly for retaining the conductors in place.

If the insulator assembly defines a plurality of axially extending gaps in cooperation with the conductor, or a plurality of axially extending gaps are defined between adjacent axial sections of the conductors for conducting cooling fluid therethrough, the cooling of the coils can be effected in both efficient and highly controllable manner.

BRIEF DESCRIPTION OF THE DRAWINGS

Now the present invention is described in the following with reference to the appended drawings, in which:

FIG. 4 is a schematic view of a die assembly for forming the conductor illustrated in FIGS. 2 and 3;

FIG. 6 is a schematic view of a die assembly for forming the conductor illustrated in FIG. 5;

DETAILED DESCRIPTION OF THE PREFERRED EMBODIMENTS

In the illustrated embodiment, the conductor 10 for forming the armature coils consists of a Litz wire conductor in which a plurality of mutually insulated wires are twisted into a strand and a plurality of such strands are again twisted into a final conductor having a prescribed cross sectional shape and area. In the illustrated embodiment, the conductor is impregnated with thermosetting resin and press formed into a trapezoidal cross sectional shape by using both pressure and heat so that each individual wire is welded to each other by the thermosetting resin. Therefore, the conductor is enabled to retain its shape and individual wires are prevented from becoming loose. The use of a Litz wire conductor allows eddy current loss to be minimized. Also, phase differences between inner and outer turns in a slotless motor or generator causes circulation loss, but it can be also minimized by giving a suitable amount of twist to each strand according to the length of the strands forming a magnetic pole. Iron loss is minimized when the machinery is of a slotless type.

Figure 1:
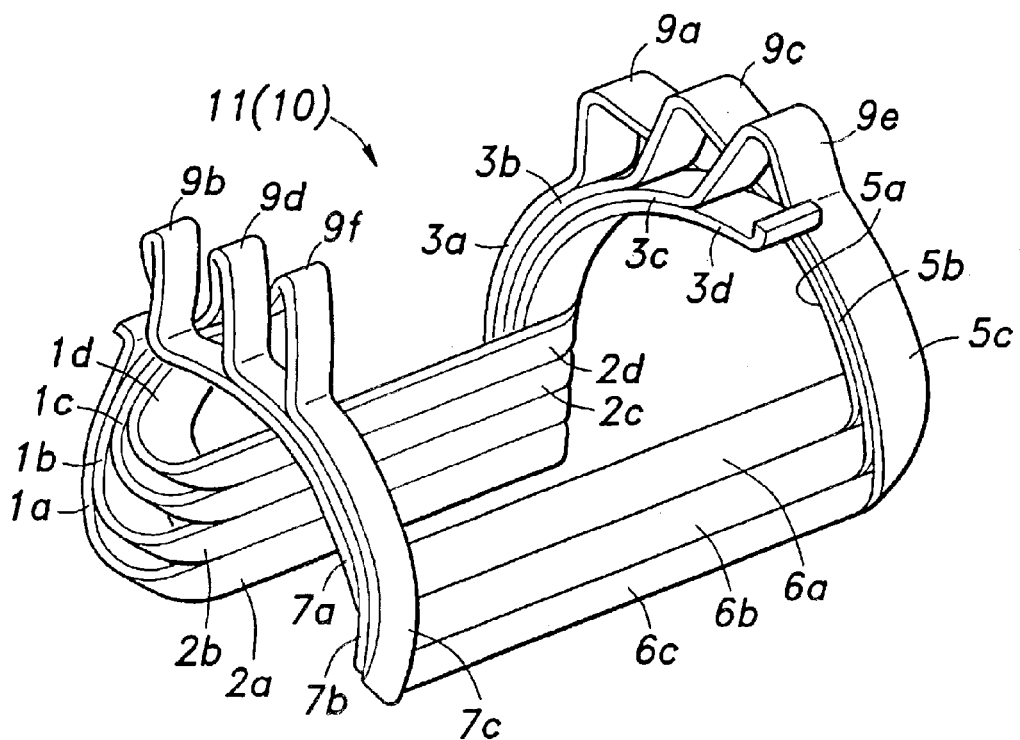
FIG. 1 is a perspective view of a coil block embodying the present invention.

Referring to FIG. 1, a coil block which is generally denoted with numeral 11 includes relatively short outer layer axial sections 2a to 2d and relatively long inner layer axial sections 6a to 6c. The axial sections of each group are disposed one next to the other in an edgewise fashion so as to define a cylindrical surface of the inner or outer layer as the case may be.

The front ends of these axial sections are joined by relatively short curved sections 1a to 1d and relatively long curved section 7a to 7c. These two groups of curved sections are joined by axial offset sections 9b, 9d, 9f in the from of radially outwardly projecting sections of the conductor 10 which provide an axial offset and reverse the layer order of the curved sections from the one group to the other. Please note that, for instance, the long curved section 7c which is on the outermost layer of its group continues to the short curved section 1d which is on the innermost layer of its group.

The rear ends of the axial sections are similarly joined by relatively long curved sections 3a to 3d and relatively long curved sections 5a to 5c. These two groups of relatively long curved sections are joined by axial offset sections 9a, 9c, 9e in the from of radially outwardly projecting sections of the conductor 10 which provide an axial offset and reverse the layer order of the curved sections from the one group to the other. Please note that, for instance, the relatively long curved section 3a which is on the outermost layer of its group continues to the relatively long curved section 5a which is on the innermost layer of its group.

In this embodiment, the conductor 10 has a uniform cross section over its entire length, but may vary in cross section so that the conductor may entirely fill the given space in the inner and outer layers even when the axial sections in the inner and outer layers are the same in number.

Figure 2:
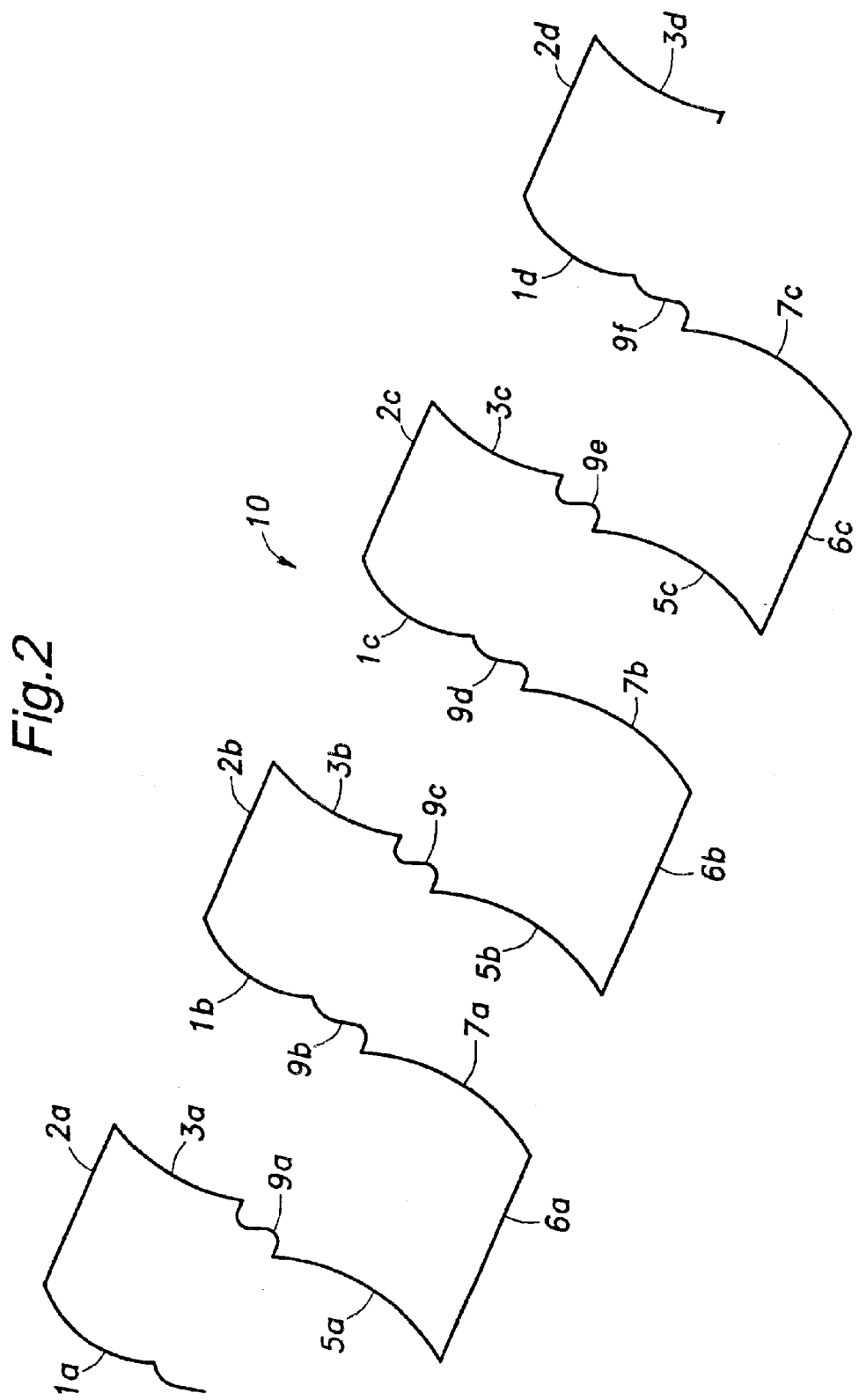
FIG. 2 is a schematic view showing a flat configuration of the conductor for forming the coil block illustrated in FIG. 1.
Figure 3:
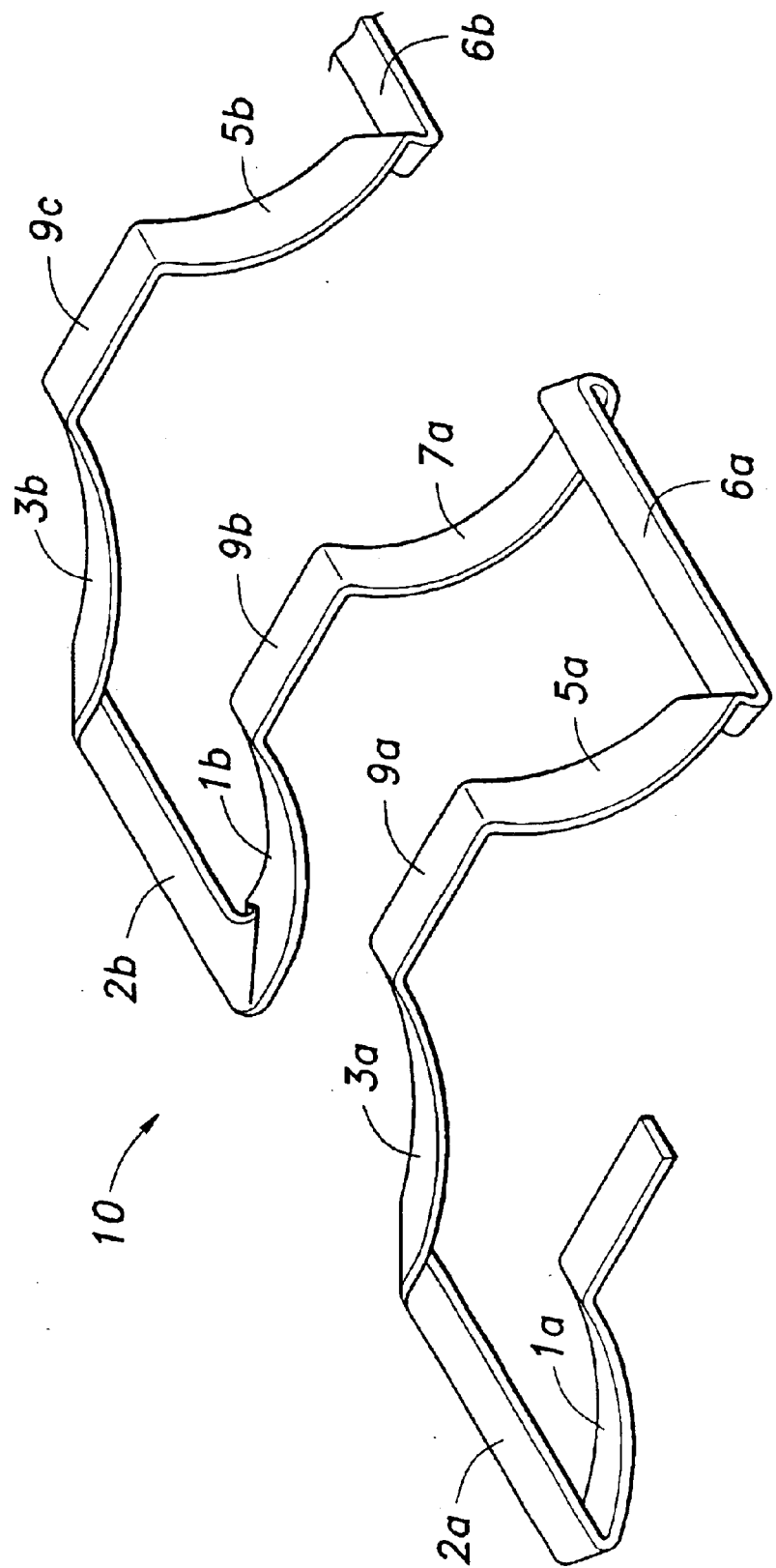
FIG. 3 is an enlarged fragmentary view of the conductor shown in FIG. 2.

FIGS. 2 and 3 show the conductor 10 which is press formed in a flat configuration by using a die arrangement illustrated in FIG. 4. There are two sets of die assemblies, those in the first set 12a to 12d being adapted to form the relatively short outer layer axial sections 2a to 2d and the adjacent curved sections 1a to 1d and 3a to 3d while those in the second group 13a to 13c are adapted to form the relatively long inner layer axial sections 6a to 6c and the adjacent curved sections 7a to 7c and 5a to 5c. In the illustrated embodiment, the four die assemblies 12a to 12d belonging to the first set are arranged one next to another along an axial direction, and the three die assemblies 13a to 13c belonging to the second set are arranged one next to another in parallel with those in the first set but in a staggered relationship. The axial offset sections 9a to 9f are left outside of these die assemblies, and remain pliant or freely deformable even after the pressing process.

The die assemblies belonging to the first set 12a to 12d differ from those in the second set in that the axial section is shorter and one of the curved section is shorter, but are otherwise similar to those in the second set 13a to 13c. The conductor 10 is then twisted by 180 degrees at selected corners so that the corresponding sections of different turns may overlie one another as illustrated in FIG. 5 and generally denoted with numeral 11.

Figure 5:
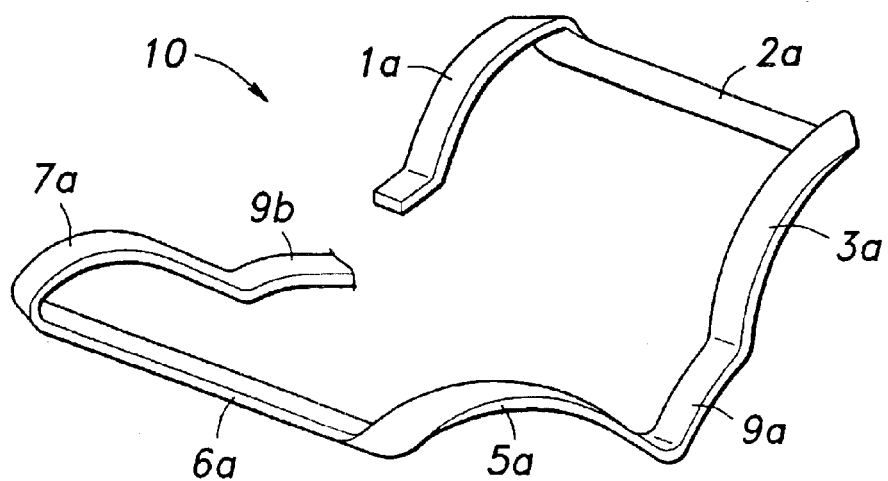
FIG. 5 is a fragmentary view showing a three-dimensional configuration of the conductor.

Alternatively, the coil block (conductor) 11 as illustrated in FIG. 5 may be press formed by die assemblies that are arranged on four different planes as illustrated in FIG. 6. The parts of the die assemblies illustrated in FIG. 6 corresponding to those in FIG. 4 are denoted with like numerals without repeating the description of such parts. The four die assemblies 12a to 12d belonging to the first set are arranged at mutually overlying positions on four different parallel planes spaced from each other by a regular interval, and the three die assemblies 13a to 13c belonging to the second set are arranged on the upper three planes opposite to the corresponding die assemblies of the first set.

Figure 7:
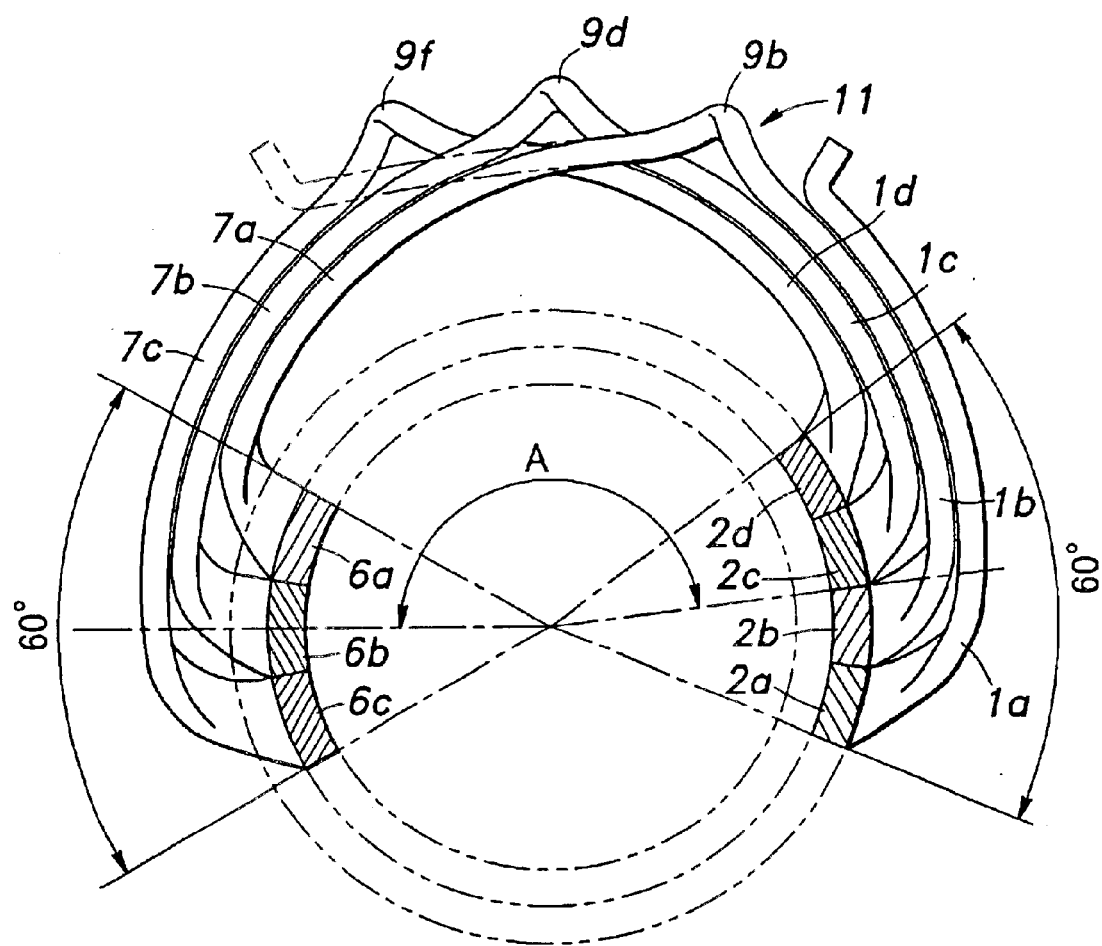
FIG. 7 is a cross sectional view of the coil block.

The process of forming the conductor 11 illustrated in FIG. 5 into that illustrated in FIG. 1 is described in the following. First of all, the short front curved section 1a at the terminal end of the conductor 11 is placed along a circumferential path, and the adjacent relatively short outer layer axial section 2a is bent by 90 degrees and placed along a generating line of a hypothetical outer cylinder (corresponding to the outer layer of the coils). The other end of the relatively short outer layer axial section 2a continues to the relatively long curved section 3a which is bent by 90 degrees and extends along a circumferential path which connects to the adjacent relatively long curved section 5a extending along a circumferential path having a somewhat smaller radius, with the aid of the axial offset section 9a. The other end of the relatively long curved section 5a connects to the relatively long inner layer axial section 6a which is bent by 90 degrees and placed along a generating line of a hypothetical inner cylinder (corresponding to the inner layer of the coils). The relatively short outer layer axial sections 2a and relatively long curved section 5a oppose each other at diametrically opposite positions as best illustrated in FIG. 7.

The other end of the relatively long inner layer axial section 6a connects to the relatively long curved section 7a which is bent by 90 degrees and extends along a circumferential path having a somewhat smaller radius than that of the relatively short curved section 1a. The relatively long curved section 7a then connects to the relatively short curved section 1b of the second turn which lies beneath the relatively short curved section 1a of the first turn via the axial offset section 9b. The other end of the relatively short curved sections 1b connects to the relatively short outer layer axial section 2b of the second turn which is bent by 90 degrees and placed along a generating line of the hypothetical outer cylinder. The relatively short outer layer axial sections 2a and 2b of the first and second turns adjoin each other in an edgewise fashion.

The other end of the relatively short outer layer axial section 2b continues to the relatively long curved section 3b which is bent by 90 degrees and underlies the relatively long curved section 3a of the first turn. The relatively long curved section 3b then connects to the relatively long curved section 5b which overlies the relatively long curved section 5a of the first turn via the axial offset section 9c. The other end of the relatively long curved section 5b connects to the relatively long inner layer axial section 6b which adjoins the relatively long inner layer axial section 6a of the first turn in an edgewise fashion. The other end of the relatively long inner layer axial section 6b connects to the relatively long curved section 7b which is bent by 90 degrees and overlies the relatively long curved section 7a of the first turn. The relatively long curved section 7b then connects to the relatively short curved section 1c of the third turn which underlies the relatively short outer layer axial sections 1b of the second turn via the axial offset section 9d. The other end of the relatively short curved sections 1c connects to the relatively short outer layer axial section 2c of the third turn which is bent by 90 degrees and placed along a generating line of the hypothetical outer cylinder, immediately next to the relatively short outer layer axial section 2b of the second turn.

By repeating this process, the coil block 11 eventually includes four relatively short outer layer axial sections 2a to 2d and three relatively long inner layer axial sections 6a to 6c, and the other terminal end of the conductor 10 consists of the relatively long curved section 3d which extends from the last short outer layer axial section 2d. As shown in FIG. 7, the four relatively short outer layer axial sections 2a to 2d extend over 60 degrees, and three relatively long inner layer axial sections 6a to 6c similarly extend over 60 degrees.

By coaxially combining six of such coil blocks 11 so as to shift each from the adjacent one by a prescribed angle (60 degrees) in the circumferential direction, one can obtain a three-phase coil assembly in which each phase is associated with a diagonally opposed pair of coil blocks 11. Because each of the three phases is associated with two coil blocks, each phase extends over the angle of 120 degrees, and the three phases jointly extend over the entire circumference or 360 degrees.

Figure 8:
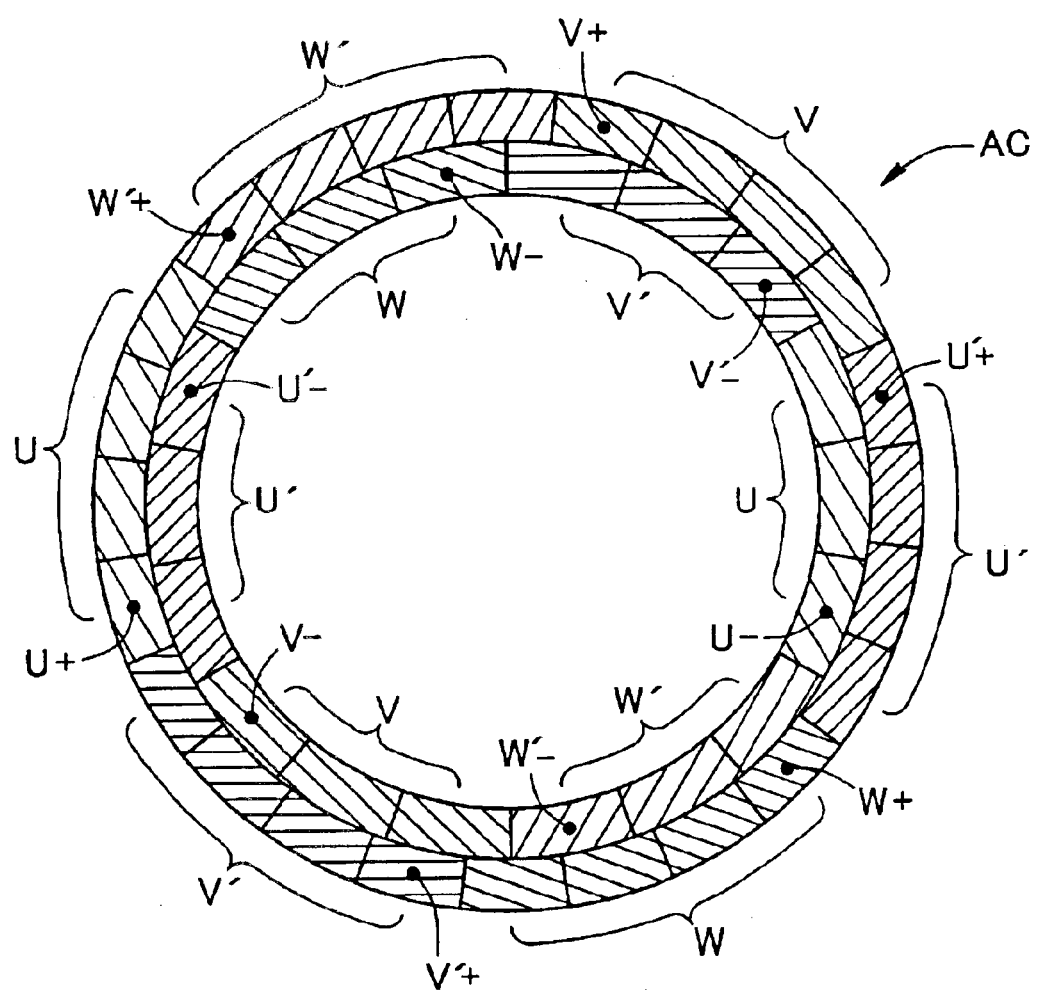
FIG. 8 is a layout view of the coil block.
Figure 9:
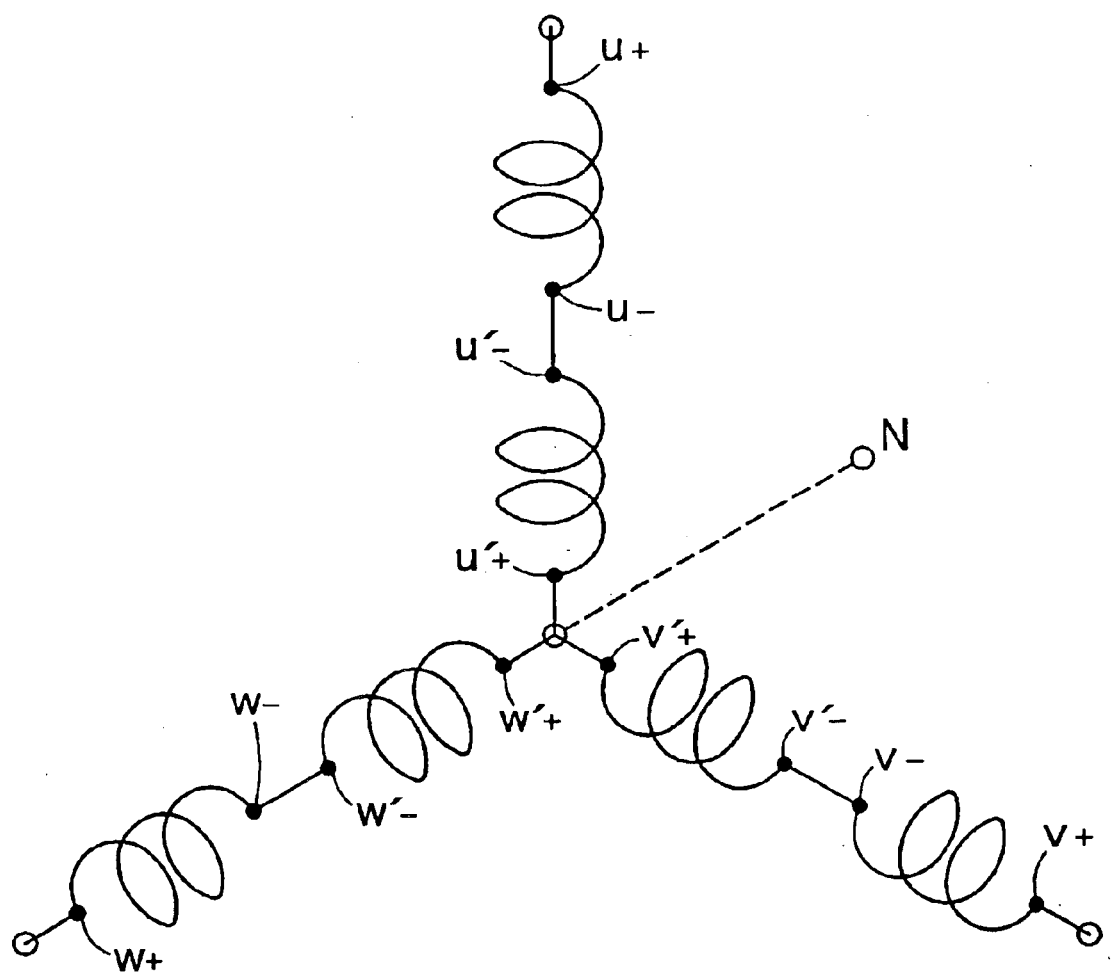
FIG. 9 is a circuit diagram of the three-phase coils.

Referring to FIGS. 8 and 9, regarding block u and block u', for instance, because the axial sections 6 of the inner layer and the axial sections 2 of the outer layer diametrically oppose each other, the u+ to u− winding and u'+ to u'− winding produce voltages of mutually opposite phases. Therefore, the U-phase coil can be formed by connecting u− and u'− terminals to each other in series. The coils of the remaining phases are also formed, and the u'+, v'+ and w'+ terminals are commonly connected as the neutral point (N). The terminal ends of the conductors can be connected to each other by using a bus bar, clamps or the like.

The angle between the centers of the two sets of axial sections 2 and 6 for each block is given as angle A in FIG. 7, and this angle can be freely determined by suitably selecting the lengths of the curved sections 1, 3, 5 and 7 and the shape of the axial offset sections 9. Also, the width of each set of axial sections 2 and 6 can be selected independently from the angle A because the coils of the inner and outer layers are mutually independent from each other.

Figure 10:
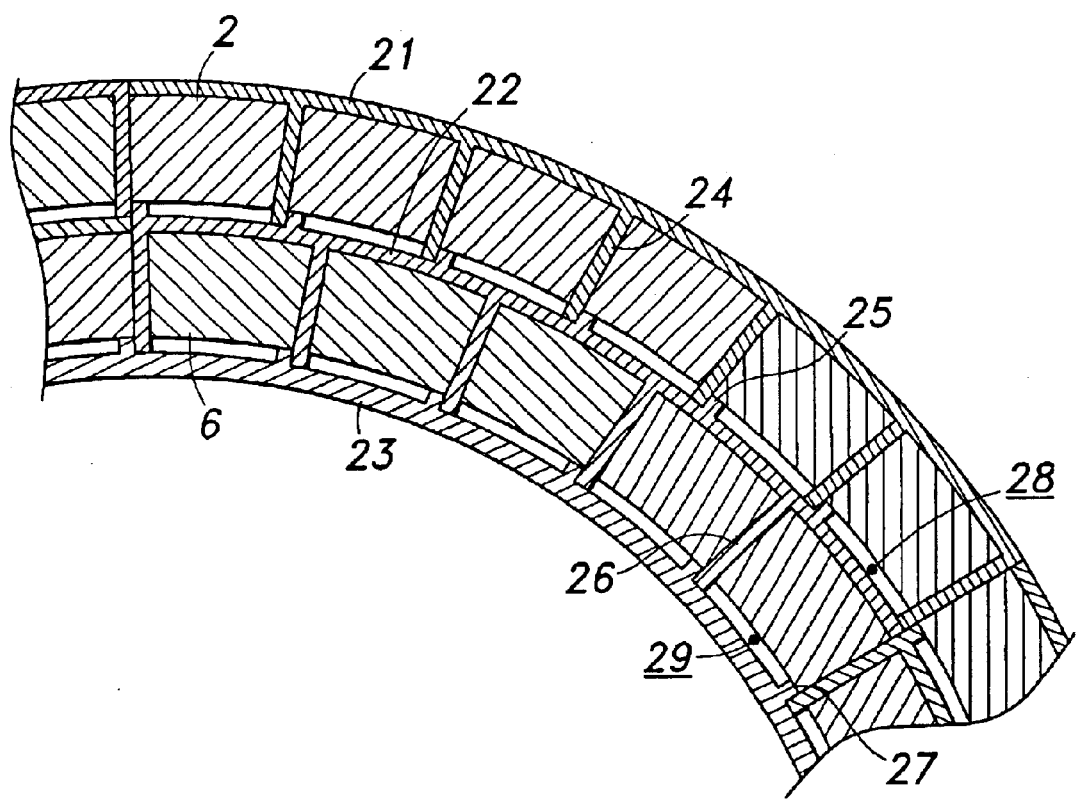
FIG. 10 is a fragmentary cross sectional view showing the coils retained by an insulator assembly.
Figure 11:
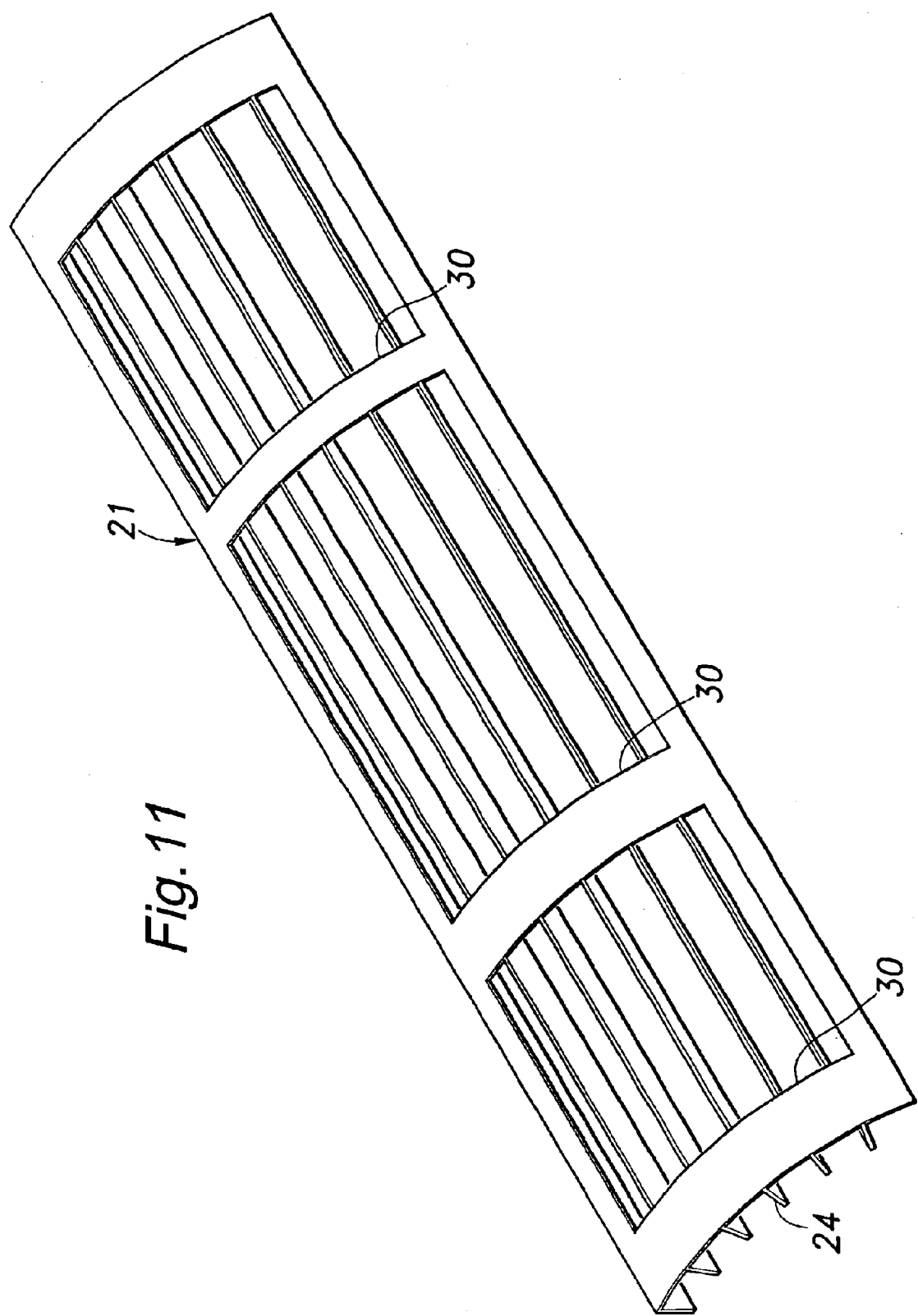
FIG. 11 is an external perspective view of the outer insulator.

Referring to FIGS. 10 and 11, each coil block 11 is held in position by an insulator assembly including an outer insulator 21, an inner insulator 22 and an inner sleeve 23 which jointly engage the axial sections 2 and 6 of the coil block 11. (Please note that the illustrated insulator assembly is adapted for coil blocks having six axial sections on the outer layer and five axial sections on the inner layer whereas the coil block illustrated in FIG. 1 has four axial sections on the outer layer and three axial sections on the inner layer.)

The outer insulator 21 essentially consists of a partial cylindrical shell having a prescribed axial length and extending over the angle of 60 degrees, and is provided with six axially extending ribs 24 on the inner surface thereof. These ribs 24 define six axial slots for individually retaining the corresponding outer layer axial sections 2 of the coil block 11. The inner insulator 22 also essentially consists of a partial cylindrical shell having a prescribed axial length and extending over the angle of 60 degrees, and is similarly provided with five axially extending ribs 26 on the inner surface thereof. These ribs 26 define five axial slots for individually retaining the corresponding inner layer axial sections 6 of the coil block 11. The outer surface of the inner insulator 22 is provided with six low axial ribs 25 which engage the corresponding ribs 24 of the outer insulator 21 so that the inner and outer insulators 21 and 22 are retained to each other at a prescribed angular or phase relationship with respect to the center of the generator.

The cylindrical shell portions of the outer and inner insulators 21 and 22 may be provided with openings 30. Although not shown in the drawings, these openings 30 may be closed by a sheet consisting of mesh made of fluoride plastic material having a required heat resistance, mechanical strength and rigidity and this sheet may be impregnated with silicone plastic material having a favorable heat conductivity and electric insulation. This would protect the electric insulation of the individual coil wire even when the laminated iron plates forming the stator core should have sharp burrs.

The inner sleeve 23 is essentially given with a hollow cylindrical shape, and is provided with a plurality of low axial ribs 27 which engage the corresponding ribs 26 of the inner insulator 22 so that the inner sleeve 23 is kept at the same angular or phase relationship with respect to the inner insulator 22.

The low ribs 25 and 27 provided on the outer surfaces of the inner insulator 22 and inner sleeve 23 serve as spacers that define a circumferentially elongated gap 28 between the inner surface of each outer layer axial section 2 and the opposing outer surface of the inner insulator 22 and a circumferentially elongated gap 29 between the inner surface of each inner layer axial section 6 and the opposing outer surface of the inner sleeve 23. These gaps 28 and 29 extend axially over the entire length of the coil block, and can be used for conducting cooling fluid during the operation of the generator. If the inner sleeve 23 is made of material having a high thermal conductivity, the inner gaps 29 may be omitted. In this embodiment, the ribs consist of partition walls having a substantially uniform thickness so that the conductor 10 is provided with a corresponding trapezoidal or sector shape.

Figure 12:
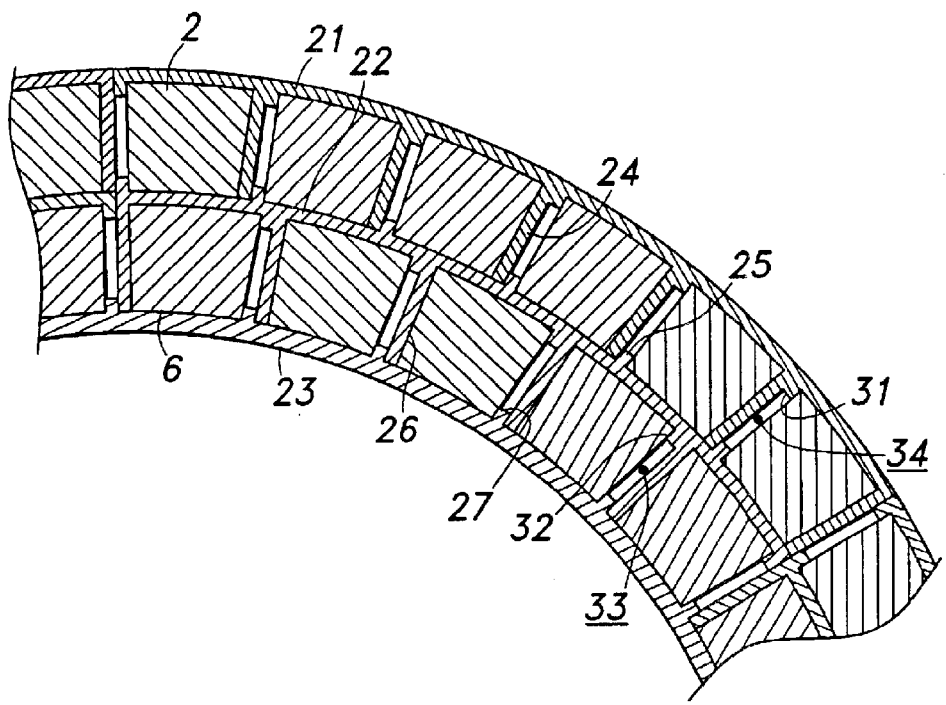
FIG. 12 is a view similar to FIG. 10 showing an alternate embodiment.

The insulator assembly is not limited by the foregoing example, but may be constructed in various different ways. FIG. 12 shows such an example, and the parts corresponding to those shown in FIG. 10 are denoted with like numerals without repeating the description of such parts. The base end of each axial rib 24 of the outer insulator 21 is provided with a projection 31, and low axial ribs 25 radially aligning with these projections 31 are formed on the outer surface of the inner insulator 22 so that a somewhat radially elongated gap 36 is defined between a side of each axial rib 25 and opposing side of the conductor 10. Similarly, the base end of each axial rib 26 of the inner insulator 22 is provided with a projection 32, and low axial ribs 27 radially aligning with these projections 32 are formed on the outer surface of the inner sleeve 23 so that a somewhat radially elongated gap 33 is defined between a side of each axial rib 24 and opposing side of the conductor 10. Thus, the conductor 10 abuts the insulator assembly on three sides thereof, and is exposed to the gap 35 or 36 on the remaining side thereof. These gaps 35 and 36 similarly extending over the entire length of the coil block can be similar used as passages for conducting cooling fluid.

Figure 13:
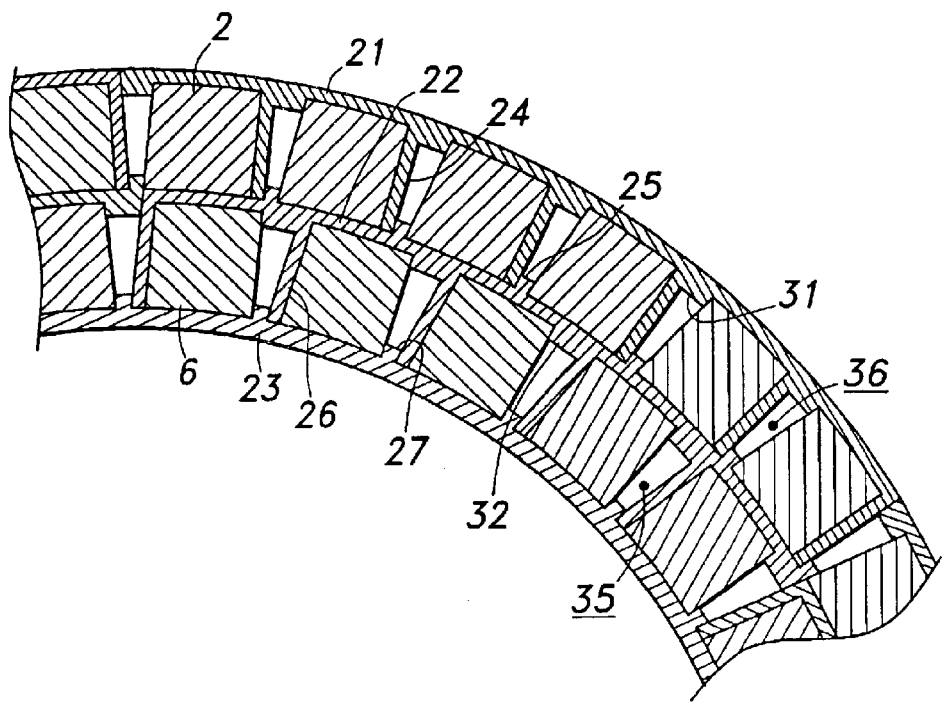
FIG. 13 is a view similar to FIG. 10 showing another alternate embodiment.

FIG. 13 shows another such example, and, again, the parts corresponding to those shown in FIG. 12 are denoted with like numerals without repeating the description of such parts. In this case, the conductor 10 has a substantially rectangular cross section so that the gaps 35 and 36 are sector-shaped.

Although the present invention has been described in terms of preferred embodiments thereof, it is obvious to a person skilled in the art that various alterations and modifications are possible without departing from the scope of the present invention which is set forth in the appended claims.

What is claimed is:

1. An armature coil for a rotary electric machinery such as electric generators and motors including a plurality of identical coil blocks each formed by a plurality of turns of an elongated conductor so as to correspond to different phases, characterized by that:

each of said coil blocks includes two groups of axial sections which are diametrically opposed to each other and curved sections joining said two groups to each other at each axial end, the axial sections of one of said groups being disposed in an inner cylindrical layer while the axial sections of the other of said groups are disposed in an outer cylindrical layer which is coaxial with said inner cylindrical layer; and said coil blocks are combined with each other by circumferentially shifting one coil block from another in such a manner that said axial sections are arranged circumferentially along said inner and outer cylindrical layers one next to another.

2. An armature coil according to claim 1, wherein a number of the axial sections disposed in said inner cylindrical layer is smaller than a number of axial sections disposed in said outer cylindrical layer by one.

3. An armature coil according to claim 1, wherein said curved sections include a first curved sections connected to an axial end of each of said axial sections of said one group, a second curved section connected to a same axial end of a corresponding one of said axial sections of said other group, and an axial offset section joining the other ends of said first and second curved sections to each other so as to provide an axial offset and reverse a layer order of said curved sections in relation to the corresponding curved sections of adjacent turns.

4. An armature coil according to claim 1, wherein each of said coil blocks is formed by a Litz wire conductor which is molded into a prescribed cross sectional shape.

5. An armature coil according to claim 4, further comprising a substantially cylindrically shaped insulator assembly for retaining said conductors in place.

6. An armature coil according to claim 5, wherein said insulator assembly defines a plurality of axially extending gaps in cooperation with said conductor for conducting cooling fluid therethrough.

7. An armature coil according to claim 1, wherein a plurality of axially extending gaps are defined between adjacent axial sections of said conductors for conducting cooling fluid therethrough.

* * * * *